United States Patent
Buchsbaum

(10) Patent No.: US 7,149,033 B2
(45) Date of Patent: Dec. 12, 2006

(54) UV VISUAL LIGHT BEAM COMBINER

(75) Inventor: Philip E. Buchsbaum, Oldsmar, FL (US)

(73) Assignee: Ocean Optics, Inc., Dunedin, FL (US)

( * ) Notice: Subject to any disclaimer, the term of this patent is extended or adjusted under 35 U.S.C. 154(b) by 32 days.

(21) Appl. No.: 10/976,112

(22) Filed: Oct. 28, 2004

(65) Prior Publication Data

US 2006/0092520 A1    May 4, 2006

(51) Int. Cl.
*G02B 27/10* (2006.01)
*G02B 27/14* (2006.01)
*G02B 13/00* (2006.01)
*H04N 7/18* (2006.01)
*A61B 1/06* (2006.01)

(52) U.S. Cl. .............. 359/618; 359/629; 359/722; 359/580; 359/583; 359/589; 348/80; 348/744; 348/751; 348/757; 348/786; 600/178; 600/476; 250/504 R; 313/112

(58) Field of Classification Search ............... 359/618, 359/629, 634, 722, 580, 583, 584, 589, 590; 348/71, 80, 743, 744, 751, 757, 786; 600/160, 600/178, 181, 476; 313/112, 512; 250/504 R, 250/493.1
See application file for complete search history.

(56) References Cited

U.S. PATENT DOCUMENTS

| | | | | |
|---|---|---|---|---|
| 2,553,182 A | * | 5/1951 | Cage | 348/786 |
| 4,974,076 A | * | 11/1990 | Nakamura et al. | 348/71 |
| 5,563,420 A | * | 10/1996 | Sullivan et al. | 250/504 R |
| 6,161,035 A | * | 12/2000 | Furusawa | 600/476 |
| 6,482,150 B1 | * | 11/2002 | Utsui | 600/178 |
| 6,768,127 B1 | * | 7/2004 | Eggers et al. | 250/504 R |
| 6,961,080 B1 | * | 11/2005 | Richardson | 348/80 |

* cited by examiner

*Primary Examiner*—Loha Ben
(74) *Attorney, Agent, or Firm*—Dennis L. Cook, Esq.

(57) ABSTRACT

An improved light beam combiner is disclosed that creates a more uniform light source across the UV, Visual, and NIR range. It is an optical mechanical device made up of a standard high low dielectric thin film which, when placed at a 45 degree angle between a Deuterium lamp and a Halogen or Tungsten lamp, reflects the UV portion of a Deuterium lamp and passes the visual portion while also allowing the visual energy of a Halogen or Tungsten lamp to pass resulting in a more uniform light source for use in spectroscopy.

14 Claims, 3 Drawing Sheets

UV VISUAL LIGHT BEAM COMBINER

FIELD OF THE INVENTION

This invention relates, generally, to an improved Light Beam Combiner that creates a more uniform light source across the UV, Visual, and NIR range. More specifically it is an optical mechanical device which reflects the UV portion of a Deuterium lamp and passes the visual portion while allowing the visual energy of a Halogen or Tungsten lamp to pass giving a more uniform light source for use in spectroscopy.

BACKGROUND OF THE INVENTION

Spectral analyzers have long gained favor because they provide a fast and non-destructive means of analyzing different types of samples. Based on this technology, it is possible not only to determine the characteristics of a sample surface, but sometimes the constituent components beneath a sample surface. Typically, an optimal range of wavelengths is selected to irradiate a sample, where reflected or transmitted light is measured to determine the characteristics of the sample. Some samples, for example, are best analyzed using an ultraviolet spectrum of light while others are optimally analyzed using a range such as visible or near infrared spectrum.

Analyzers of the prior art typically use a filter wheel or scanning diffraction grating to serially generate the specific wavelengths that are of interest in analyzing a sample. Based on moving parts, filter wheels and scanning diffraction gratings are sensitive to vibration and are not reliable in analyzing a sample generally. They therefore are not suitable for withstanding the mechanical vibrations generated by machinery, and therefore have not found use in real-time measurements of samples other than in controlled laboratories.

Most spectral analyzers utilize a narrow spot size to intensely irradiate a sample to be analyzed. This is largely due to the fact that most wavelength detectors for analyzing a sample depend on reflected light that is transmitted through a fiber optic cable. Illuminating a sample with a highly intense incident light typically results in a greater amount of reflected light that is more easily measured by a detection device, which is often limited in sensitivity. Illuminating a sample with a highly intense incident light made up of the optimal range of light spectrum further enhances the sensitivity.

Some spectral analyzers further include an illuminating source disposed in the same cavity as a detector that receives the reflected light from an irradiated sample. In such a case, stray light reflecting from within the chamber, rather than off the sample, is sometimes erroneously included in the measurement. This often has a devastating impact on measurement accuracy. The overall design of a spectral analyzer, therefore, including its individual components such as its light source, is critical to provide the most accurate method of detecting subtle differences in an analyzed sample. These problems have been addressed by numerous prior art devices that have greatly advanced the dependability and accuracy of spectroscopy but none have disclosed the mechanical optical light beam combiner of this application.

Relevant prior art patents discussing light sources include U.S. Pat. No. 6,256,700 titled Efficient Light Engine Systems, Components and Methods of Manufacture by Strobl issued Mar. 12, 2002 discloses an etendue efficient angle conversion system that operates in a quasi-imaging mode. This system is capable of generating angular and spatial axial asymmetric output beams and is also capable of incorporating therein optional color reformatting capabilities. With the aid of anamorphic beam transformers such asymmetric beams can further be reformatted to spatially and angularity match particular illumination needs of a target. This system can further be applied to the design of fiber optic illumination systems and projection display systems and can further be combined with delivery efficiency maximization concepts. In addition, delivery efficiency improvements of light engines can be obtained with the use of optimized lamp, reflector, integrators, anamorphic beam transformers, coupling optics, etc. The U.S. Pat. No. 6,256,700 patent discusses an extensive overview of light sources, or light engines for various purposes, but does not disclose the unique mechanical optical design of this application.

U.S. Pat. No. 5,619,284 issued to Magocs on Apr. 8, 1997, titled Beam combiner for LCD projector utilizing a penta-prism discloses a beam combiner for an LCD projection television system makes use of a penta-prism which focuses three separate light sources on a viewing screen. The use of a penta-prism as a beam combiner allows for a compact light path, simplicity of manufacturing and a cost effective dichroic mirror arrangement as part of the penta prism. The light path within the penta-prism from the three light sources forms a right-angled triangle which provides the above-identified advantages. Also U.S. Pat. No. 6,147,720 issued to Guerinot et al. on Nov. 14, 2000 titled Two lamp, single light valve projection system discloses a projection system includes first and second light sources which are disposed at an angle with respect to each other and are activated during respective different phases of an illumination cycle to illuminate a spot on different sides of a segmented rotary filter wheel. The filter wheel is alternately used to transmit light from one of the light sources, and to reflect light from the other light source, to a light valve, the output of which is projected onto a screen. The wheel segments may be alternately clear and mirrored or may alternately transmit and reflect colors to produce color sequential illumination of the light valve. In addition to filter wheels producing sequences of red, blue, green illumination, including the possibility of splitting a color phase into non-adjacent smaller phases to reduce color artifacts, a simple filter wheel which in two rotations produces a sequence of red, blue, green, cyan, magenta, yellow color illumination, resulting in an expanded color gamut, is also disclosed. Blanking intervals during which both lamps are turned off span each passage of a segment boundary through the spot. These patents, although discussing light sources, do not disclose the invention of this application. The devices of the prior art patents are for projection systems and are not intended for spectral illumination of a target substance using two light sources.

U.S. Pat. No. 5,155,628 issued to Dosman on Oct. 13, 1992 titled Optical transmission spectrometer discloses an optical transmission spectrometer for transmission measurements of absorbing and scattering samples that includes light sources mounted parallel to each other in a holder. The beams of light emanating from the light sources are directed through a beam-combiner. The beam-combiner includes a first refractive surface at an angle of incidence of 45.degree. The first refractive surface refracts light toward a common axis. The beam-combiner includes a second refractive surface parallel to the first refractive surface for refracting the beam of light along a common axis parallel to the original direction of the beam of light. The beam-combiner can include additional refractive surfaces for other beams of light to combine the beams of light into a primary beam. The spectrometer includes a collimating tube extending along the common axis for baffling stray light and directing the primary beam through a sample. A second collimating tube is provided on the side of the sample opposite the first collimating tube for baffling stray light passing through the sample. The second collimating tube directs the primary beam to a detector package mounted in a holder, where the detector viewing area of the sample is limited to that of the primary beam. As an alternative, an optic which is capable of directing multiple light beams onto a common intersection point may be used in place of the previously mentioned beam-combiner. Unlike the beam-combiner which closely aligns multiple parallel light beams and transmits them as substantially a single beam along the common axis, the alternate optical directs multiple light beams at an angle onto a common intersection point. The optic is fabricated from translucent material with first and second refractive surfaces for receiving light beams from a source and refracting the light beams toward the common intersection point. The beam combiner of this prior art patent is similar in some respects to the combiner of this application but the U.S. Pat. No. 5,155,628 patent uses only reflectors to effect the combination while this invention beam combines while spectrally filtering the light from each source to create a more uniform light source The balance of this specification discusses the features of the inventive light beam combiner in detail.

SUMMARY OF THE INVENTION

This invention is an improved light beam combiner that creates a more uniform light source across the UV, Visual, and NIR range. It is an optical mechanical device made up of a standard high low dielectric thin film which, when placed at a 45 degree angle between a Deuterium lamp and a Tungsten or Halogen lamp reflects the UV portion of a Deuterium lamp and passes the visual portion while also allowing the visual energy of a Halogen/Tungsten lamp to pass resulting in a more uniform light source for use in spectroscopy.

It is therefore clear that a primary object of this invention is to advance the art of beam combiners by describing a simple mechanical optical device that supplies a uniform light source. It is also an object of the present invention to provide a beam combiner free of the defects found in the conventional art. A more specific object is to advance said art by providing a light beam combiner for use in spectroscopy.

It is yet another object of this invention to use one or more filters between the deuterium lamp and the beam combiner in order to further strip the visual signal out of the deuterium lamp. Further, it is another object of this invention to include variable attenuation of the halogen lamp which provides additional control of the system and facilitates precision tuning of the system.

These and other important objects, features, and advantages of the invention will become apparent as this description proceeds. The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
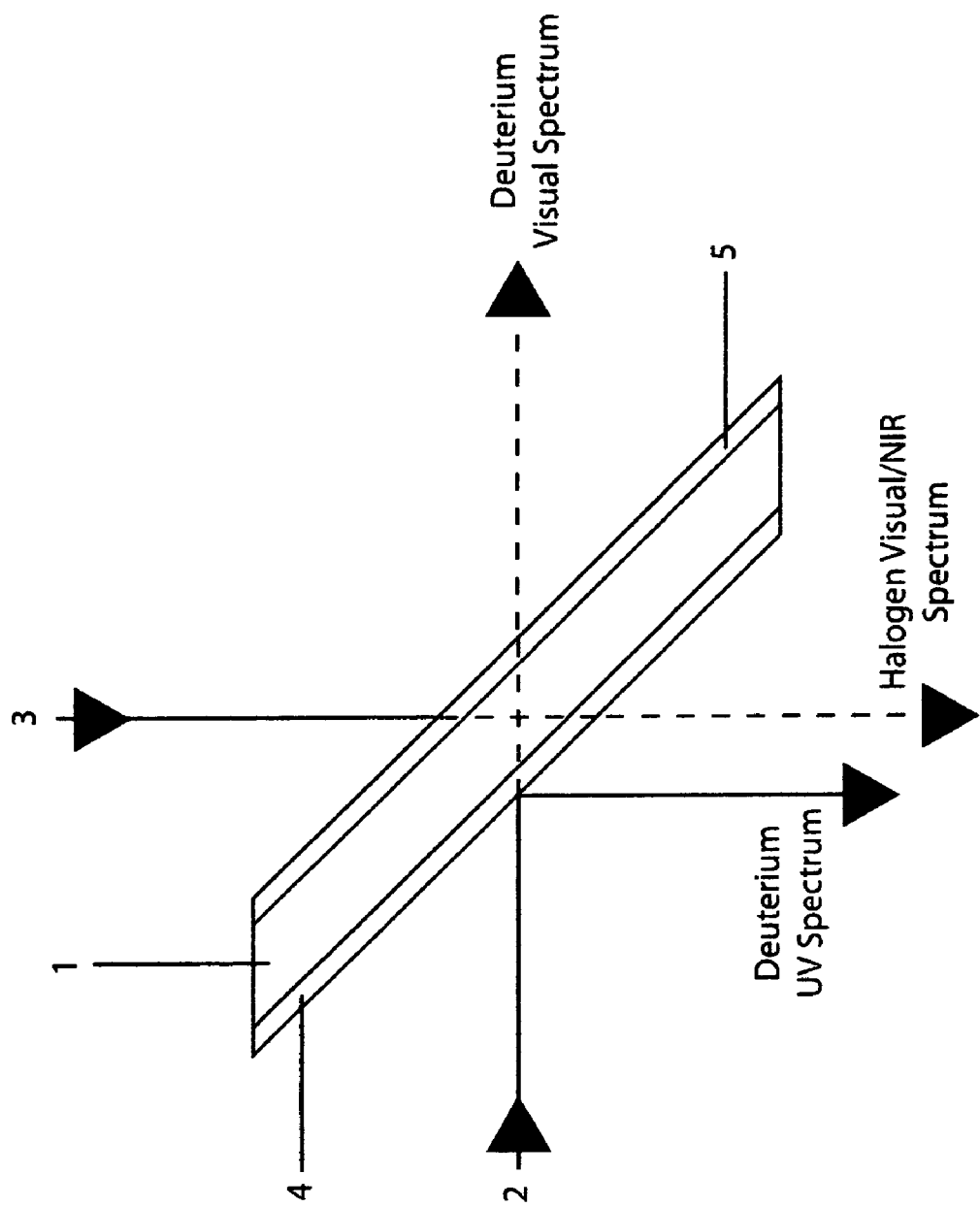
FIG. 1 is a schematic of the preferred embodiment of the light beam combiner.
Figure 2:
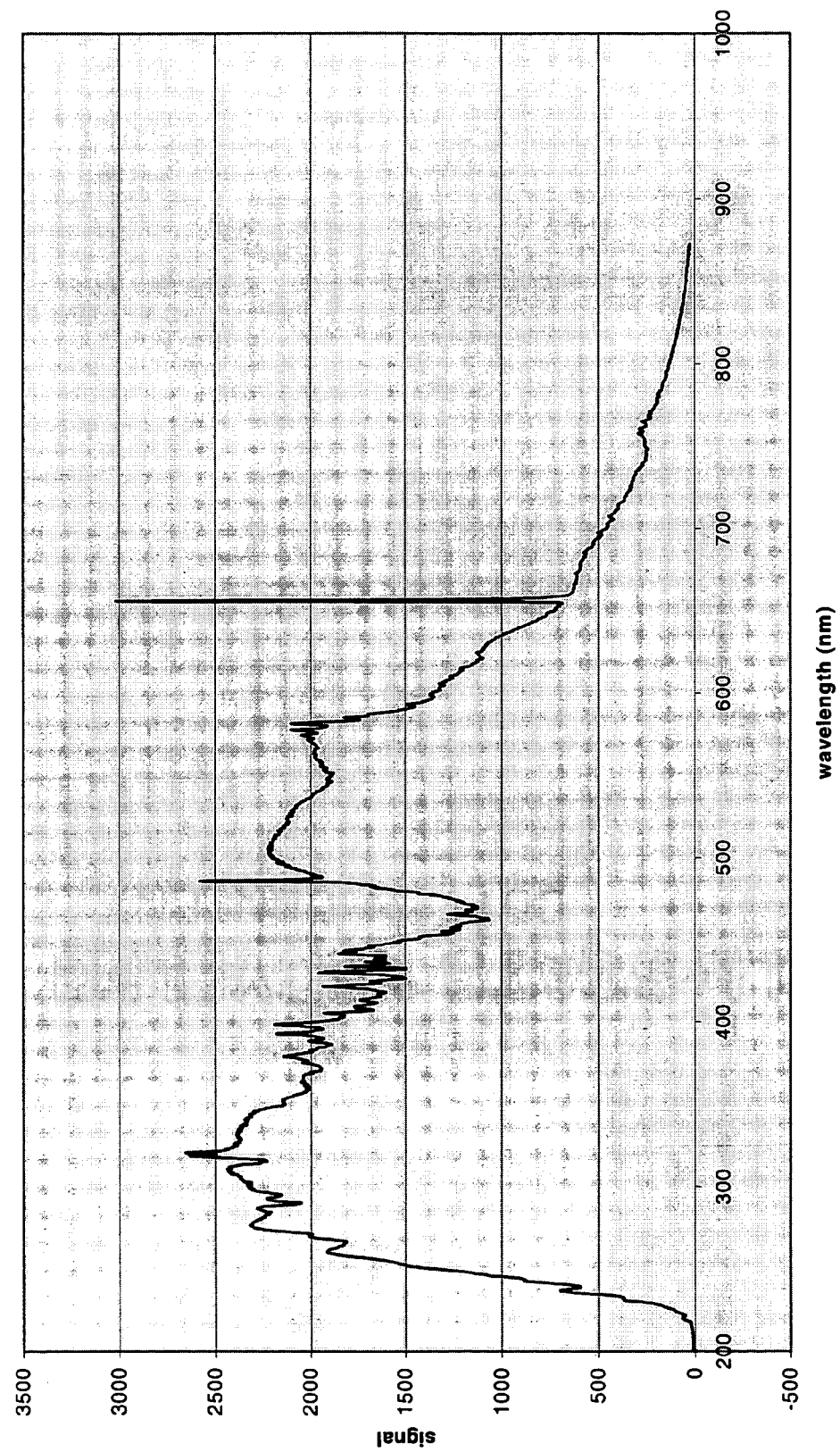
FIG. 2 is a representation of the signal strength to wavelength graph showing the uniform light results of the preferred embodiment of the light beam combiner.
Figure 3:
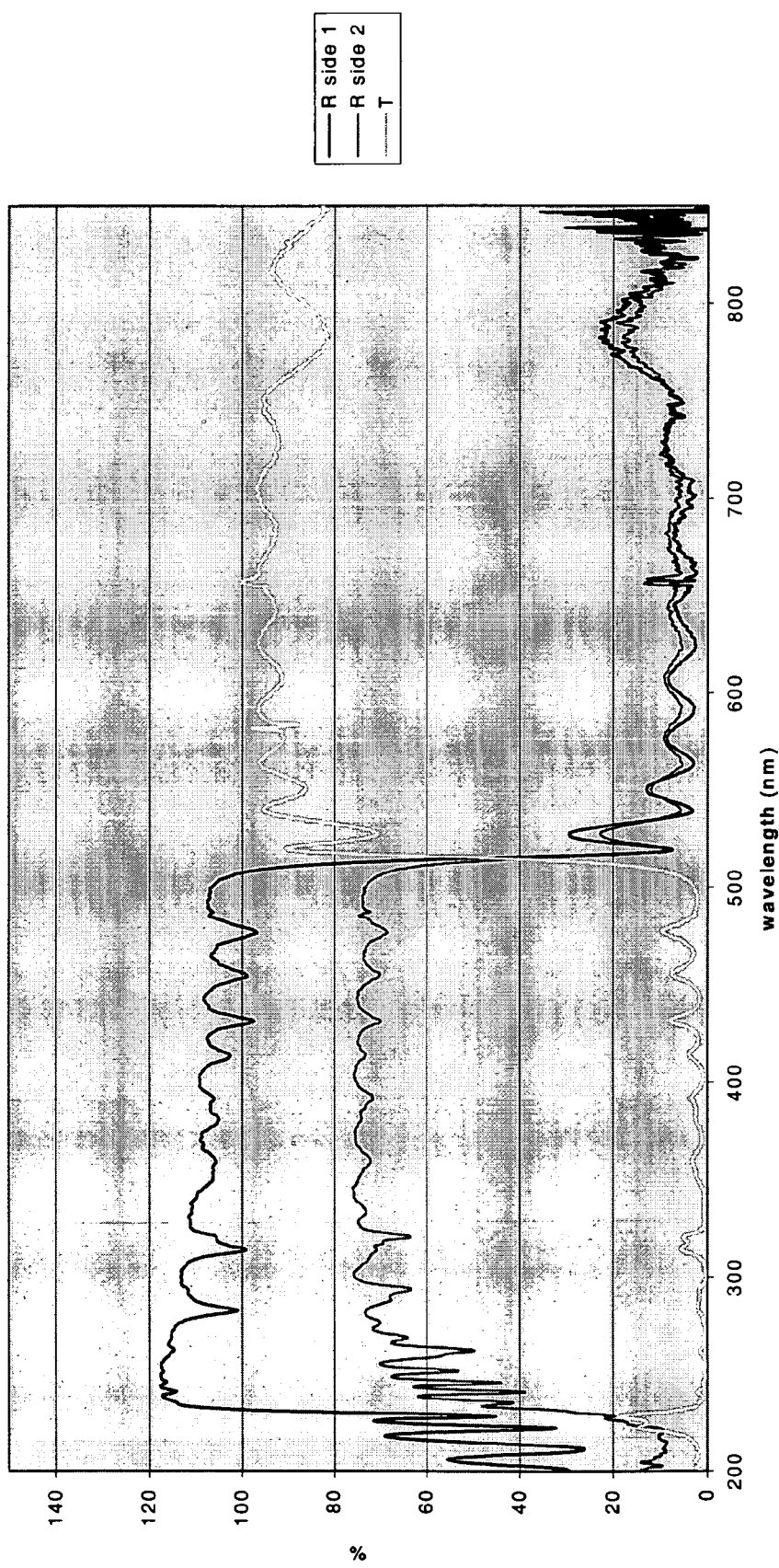
FIG. 3 is a Transmission and Reflectance graph showing the uniform light results of the preferred embodiment of the light beam combiner.

Referring now to FIG. 1, it will there be seen that the novel assembly is a simple mechanical optical device. The light beam combiner is based on a standard high low index dielectric thin film well known to those skilled in the art. In the preferred embodiment shown in FIG. 1 the film is coated on a transparent optical structure, such as clear glass, to create the filter element (1). This filter element (1) is then mounted, in any conventional manner known to those skilled in the art, at a forty-five degree (45°) angle to two light sources, a Deuterium lamp (2) and a Halogen or Tungsten lamp (3). In this configuration the filter element (1) reflects the UV wavelength portion of the Deuterium lamp (2) and passes the visual wavelength portion while allowing the visual wavelength portion of the Halogen/Tungsten (3) to pass through thus resulting in a more uniform light source across the UV, visual, and near infra-red spectrum. This result is more clearly shown in the spectrum analysis diagram of FIG. 2 and the Transmission Reflectance graph of FIG. 3.

Additionally one or more filters (not shown), the type and use of which are well known to those skilled in the art, can be placed between the Deuterium lamp (2) and the filter element (1) in order to further strip the visual signal out of the Deuterium lamp. Further, variable attenuation of the Halogen/Tungsten lamp (3) may be added in a manner well known to those skilled in the art. This addition of attenuation provides additional control of the system and facilitates precision tuning of the system.

It will thus be seen that the objects set forth above, and those made apparent from the foregoing description, are efficiently attained. Since certain changes may be made in the foregoing construction without departing from the scope of the invention, it is intended that all matters contained in the foregoing construction or shown in the accompanying drawings shall be interpreted as illustrative and not in a limiting sense.

What is claimed is:

1. A system for supplying a uniform light source using a light beam combiner comprising a deuterium lamp and a halogen lamp separated by a filter element that reflects the UV portion of said deuterium lamp and passes the visual and near infrared spectrum portion of said halogen lamp such that light from said deuterium lamp and the light from said halogen lamp strike said filter element at forty five degrees such that the reflected light and the passed light combine thereby creating a uniform light across the UV, visual, and near infrared spectrum.

2. The system of claim 1 wherein said filter element is clear glass coated on one side with a high low index dielectric thin film.

3. The system of claim 1; wherein said light beam combiner is the primary light source for spectroscopy.

4. The system of claim 1; wherein said light beam combiner is the primary light source for microscopy.

5. The system of claim 1; wherein said light beam combiner is the primary light source for light projectors.

6. The system of claim 1; wherein one or more filters are placed between said deuterium lamp and said filter element to further strip the visual signal of the deuterium lamp.

7. The system of claim 1; wherein there is variable attenuation control of the halogen lamp in order to tune the system.

8. A system for supplying a uniform light source using a light beam combiner comprising a deuterium lamp and a tungsten lamp separated by a filter element that reflects the UV portion of said deuterium lamp and passes the visual and near infrared spectrum portion of said tungsten lamp such that the light from said deuterium lamp and the light from said tungsten lamp strike said filter element at forty five degrees such that the reflected light and the passed light combine thereby creating a uniform light across the UV, visual, and near infrared spectrum.

9. The system of claim 8 wherein said filter element is clear glass coated on one side with a high low index dielectric thin film.

10. The system of claim 8; wherein said light beam combiner is the primary light source for spectroscopy.

11. The system of claim 8; wherein said light beam combiner is the primary light source for microscopy.

12. The system of claim 8; wherein said light beam combiner is the primary light source for light projectors.

13. The system of claim 8; wherein one or more filters are placed between said deuterium lamp and said filter element to further strip the visual signal of the deuterium lamp.

14. The system of claim 8; wherein there is variable attenuation control of the tungsten lamp in order to tune the system.

* * * * *